United States Patent [19]

Körfgen et al.

[11] Patent Number: 5,427,351
[45] Date of Patent: Jun. 27, 1995

[54] AUTOCLOSING FLOW-CONTROL VALVE

[75] Inventors: Harald Körfgen, Fröndenberg; Ali Karakullukcu, Menden, both of Germany

[73] Assignee: Freidrich Grohe Aktiengesellschaft, Hemer, Germany

[21] Appl. No.: 261,290

[22] Filed: Jun. 16, 1994

[30] Foreign Application Priority Data

Jul. 10, 1993 [DE] Germany .................. 43 23 063.6

[51] Int. Cl.$^6$ ............................................ F16K 21/04
[52] U.S. Cl. ............................... 251/39; 251/35; 251/42
[58] Field of Search ................... 251/33, 35, 39, 42

[56] References Cited

U.S. PATENT DOCUMENTS 3,965,922 6/1976 McCornack .
4,899,778 2/1990 Laube .

FOREIGN PATENT DOCUMENTS 1368214 9/1974 United Kingdom .

*Primary Examiner*—Gerald A. Michalsky
*Attorney, Agent, or Firm*—Herbert Dubno; Andrew Wilford

[57] ABSTRACT

An autoclosing flow-control valve assembly has a housing forming an inlet chamber normally filled with a fluid under pressure, an outlet chamber, and a main valve seat between the chambers. A piston defining in the housing a control chamber carries a valve element sealingly engageable with the seat. A piston spring braced between the piston and the housing urges the piston and element into the closed position. The piston is formed with a small bleed passage extending between the control chamber and the outlet chamber. A control passage extending between the inlet chamber and the control chamber has a pilot valve that when open pressurizes the control chamber and pushes the piston and element into the open position and when closed blocks flow through the control passage. An actuating member is actuatable to open the pilot valve and an actuating spring braced between the member and the housing urges the member out of contact with the pilot valve. A bypass passage extending between the control chamber and the outlet chamber is of substantially greater flow cross section than the bleed passage. A bypass valve in the bypass passage normally blocks flow therethrough and is opened by actuation of the actuating member to permit flow through the bypass passage so that when the actuating member is actuated with the control chamber full the control chamber can be quickly drained and the valve element and piston moved by the spring into the closed position.

13 Claims, 4 Drawing Sheets

AUTOCLOSING FLOW-CONTROL VALVE

FIELD OF THE INVENTION

The present invention relates to a valve. More particularly this invention concerns a self- or autoclosing flow-control valve of the type used on a toilet or urinal or in commercial settings on a faucet.

BACKGROUND OF THE INVENTION

A self-closing valve is standard for use on flush toilets and urinals and in institutional or commercial settings on a faucet. Such a valve opens when actuated and then closes a predetermined time after opening, so that water is not wasted.

As described in U.S. Pat. No. 4,899,778 of Laube an autoclosing flow-control valve has a housing forming an inlet chamber normally filled with a fluid under pressure, an outlet chamber, and a valve seat between the chambers. A piston defines in the chamber a control chamber and carries a valve element engageable with the seat. The piston and valve element are displaceable in the housing between a closed position with the element engaging the seat and blocking flow between the chambers and an open position with the element clear of the seat and permitting flow from the inlet chamber to the outlet chamber. A spring braced between the piston and the housing urges the piston and element backward into the closed position. The control chamber is of substantially smaller volume in the closed position than in the open position and the piston is formed with a small bleed passage extending between the control chamber and the outlet chamber. A control passage extending between the inlet chamber and the control chamber is provided with a pilot valve for, in an open position of the pilot valve, pressurizing the control chamber and pushing the piston and element into the open position and, in a closed position of the pilot valve, for blocking flow through the control passage. A control element, hereinafter termed a knob is movable on the housing to open the pilot valve.

Thus with this arrangement the knob is actuated to open the pilot valve so the pressurized water floods the control chamber and opens the valve. As soon as the knob is released the pilot valve closes and the piston and valve element are moved slowly back into the closed position by the spring as the pressure in the control chamber bleeds out through the small bleed passage. The open time is controlled by how much liquid is admitted to the control chamber.

Such a valve assembly has several drawbacks. First of all it offers the user minimal control over the amount of liquid dispensed. While the open time can be extended by holding down the knob, thereby holding the pilot valve open, this open time cannot be shortened. No matter what, the user must wait until the valve closes.

Furthermore adjusting the open time of such a valve is a fairly tricky job. It entails the painstaking disassembly of the valve to move abutments or change the bleed-passage size. Such an adjustment cannot be carried out without disassembly of the device.

Finally the known systems cannot in generally be serviced at all without turning off the water. The valve must be depressurized completely before any of its parts can be accessed.

OBJECTS OF THE INVENTION

It is therefore an object of the present invention to provide an improved autoclosing flow-control valve.

Another object is the provision of such an improved autoclosing flow-control valve which overcomes the above-given disadvantages, that is which is easy to service and adjust, without turning the supply pressure off, and whose open time can be controlled by the user.

SUMMARY OF THE INVENTION

An autoclosing flow-control valve assembly has according to the invention a housing forming an inlet chamber normally filled with a fluid under pressure, an outlet chamber, and a main valve seat between the chambers. A piston defining in the housing a control chamber carries a valve element sealingly engageable with the seat. The piston and valve element are displaceable in the housing between a closed position with the element engaging the seat and blocking flow between the chambers and an open position with the element clear of the seat and permitting flow from the inlet chamber to the outlet chamber. A piston spring braced between the piston and the housing urges the piston and element backward into the closed position. The control chamber is of substantially smaller volume in the closed position than in the open position. The piston is formed with a small bleed passage extending between the control chamber and the outlet chamber. A control passage extending between the inlet chamber and the control chamber has a pilot valve for, in an open position of the pilot valve, pressurizing the control chamber and pushing the piston and element into the open position and, in a closed position of the pilot valve, for blocking flow through the control passage. An actuating member axially movable on the housing is actuatable to open the pilot valve and an actuating spring braced between the member and the housing urges the member out of contact with the pilot valve. According to the invention a bypass passage extending between the control chamber and the outlet chamber is of substantially greater flow cross section than the bleed passage. A bypass valve in the bypass passage normally blocks flow therethrough and is opened by actuation of the actuating member to permit flow through the bypass passage so that when the actuating member is actuated with the control chamber full the control chamber can be quickly drained and the valve element and piston moved by the spring into the closed position.

Thus with this system during the closing cycle all the user has to do is bump the actuating member to open the bypass passage and cause the valve to close immediately. The flow cross section of the bypass passage is much greater than that of the bleed passage so that as soon as it is opened the valve assembly will snap into the closed position.

According to the invention the actuating member is provided with an actuating rod and the housing is formed with a bore loosely receiving the rod, forming around the rod a space constituting a portion of the bypass passage, and forming a bypass-valve seat around the actuating rod. The actuating rod is provided with a seal ring snugly fittable in the bypass-valve seat and forming therewith the bypass valve. The bypass passage has a portion opening radially inwardly into the space between the rod and the housing. The rod and bore are cylindrical and the bore has an inside diameter that is about 2% larger than an outside diameter of the rod.

The piston has an outside diameter equal to about five times the rod diameter. Furthermore the housing includes a liner forming the bore, guiding the piston, and provided with a screwthread connecting itself to the housing.

The housing according to the invention includes a faucet housing forming the inlet and outlet chambers and main valve seat and a rotation-symmetrical and stepped valve housing having a large-diameter portion holding the liner and a small-diameter portion threaded to the faucet and sealingly engaging the seat. The actuating member is a knob is displaceable along an axis on the housing and rotatable about the axis. The valve assembly further has according to the invention an abutment screw rotatable about the axis, threaded into the housing, and axially abuttable with the knob when the knob is actuated. Means is provided for releasably coupling the abutment screw to the knob for rotation of the abutment screw by the knob and changing of an axial position of the abutment screw so that the knob can be coupled to the abutment screw to change its position and the amount of time the valve assembly normally takes to autoclose. This abutment screw is tubular, coaxially surrounds the rod, and has a flange formed coaxially with the rod with an array of holes. The coupler is a screw extending parallel to but offset from an axis of the rod and screwable through the knob to engage axially in the holes and thereby couple the knob to the abutment screw.

To make the assembly vandal resistant the knob is cup shaped and has a skirt coaxially surrounding the housing. The skirt is provided with radially inwardly projecting retaining ring and the housing having an axially directed shoulder axially engageable with the retaining ring.

The piston according to the invention is formed with a stem having an end provided with a washer constituting the valve element. The stem is provided with a cap retaining the washer on the stem and having a sieve over a mouth of the control passage. The rod is formed with a seat complementarily engageable with the pilot valve.

To make the housing easy to service without shutting off the supply pressure the housing includes an outer part carrying the actuating member and the actuating spring and an inner part threaded to the outer part and carrying the piston, valve element, main spring, and pilot valve. The control passage is provided with a deflector vane.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
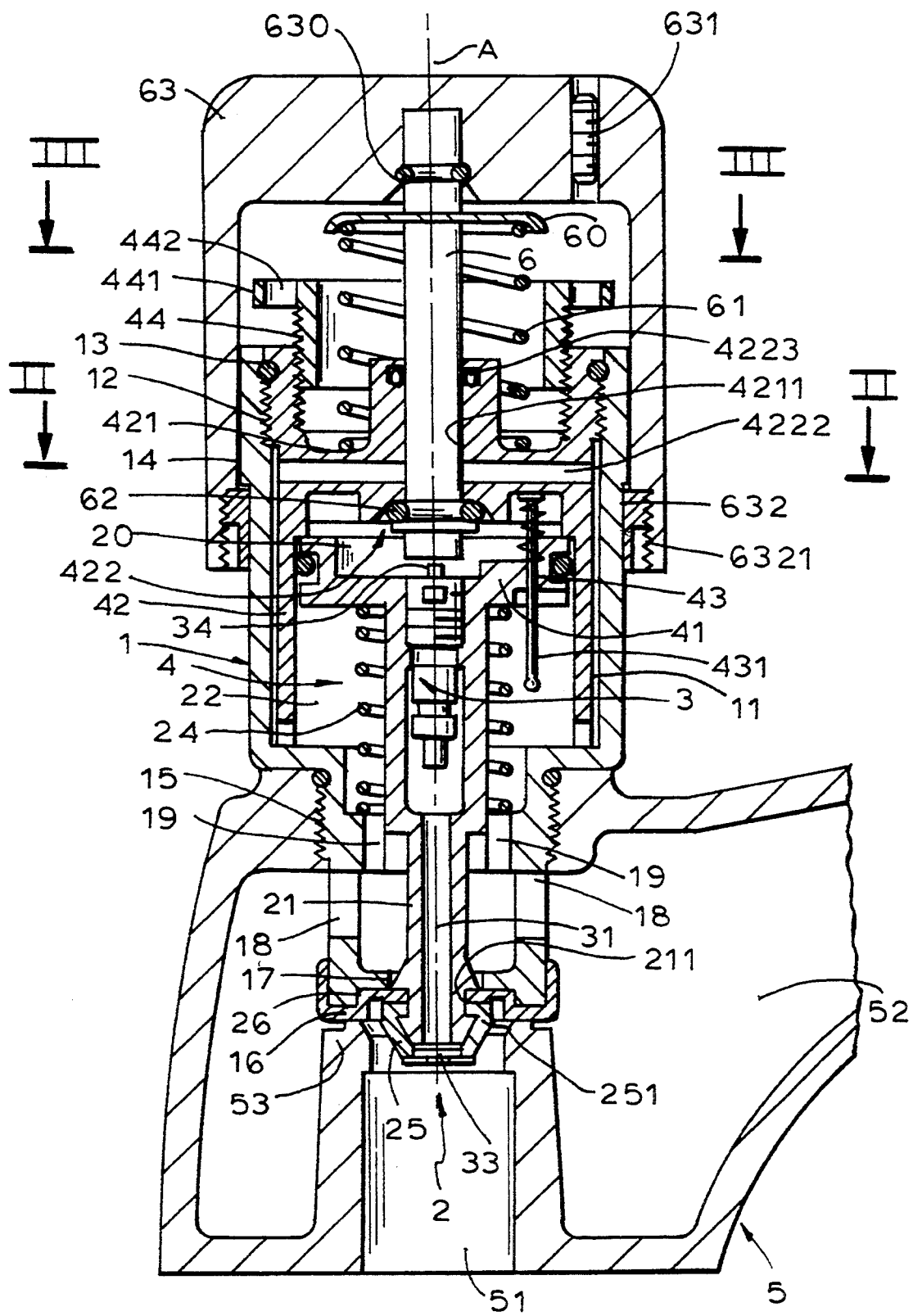
FIG. 1 is an axial vertical section through a faucet equipped with the valve assembly of this invention.

As seen in FIG. 1 the valve assembly according to this invention has a housing 1, 5 with a faucet part 5 defining an inlet chamber 51 and an outlet chamber 52. A valve seat 53 is formed between these chambers 51 and 52 so that this part 5 can be used with several different kinds of valve units. The housing 1, 5 also includes a valve housing 1 formed as a cylindrically stepped sleeve centered on an axis A and secured at a screwthread 15 to the faucet part 5. A washer 16 on the lower end of the housing 1 sealingly engages the seat 53. This housing 1 is provided with a liner sleeve 42 secured coaxially in place by a screwthread 12 with a seal 13 between it and the housing 1.

A piston 4 is axially displaceable in the lining sleeve 42. This piston 4 has a head 41 sealingly engaged and axially slidable along guide ribs 19 in the liner sleeve 42 and an axially extending tubular stem 21 whose lower end is provided with a seal washer 26 that can engage against the underside of a seat 17 formed at the lower end of the housing 1. A cap 25 has a rim 251 engaged in a radially outwardly open groove 221 formed in he stem 21 and serves to hold the seal washer 26 in place. A spring 24 braced axially between the piston 4 and the housing 1 urges the piston 4 upward into a closed position with the seal washer 26 snugly engaging the seat 17.

The piston head 41 subdivides the interior of the sleeve 42 into a control chamber 20 and a chamber 22. The control chamber 20 can be connected through a control passage 31 extending coaxially in the stem 21 with the inlet chamber 51. A normally closed pilot valve 3 in the control passage 31 prevents flow from the inlet chamber 51 into the control chamber 20 and a screen 33 on the cap 25 prevents grit from entering the control passage 31. The chamber 22 opens via holes 18 into the outlet chamber 52. The ribs 19 formed on the housing 1 permit the stem 21 to move axially while permitting axial flow past it.

Figure 4:
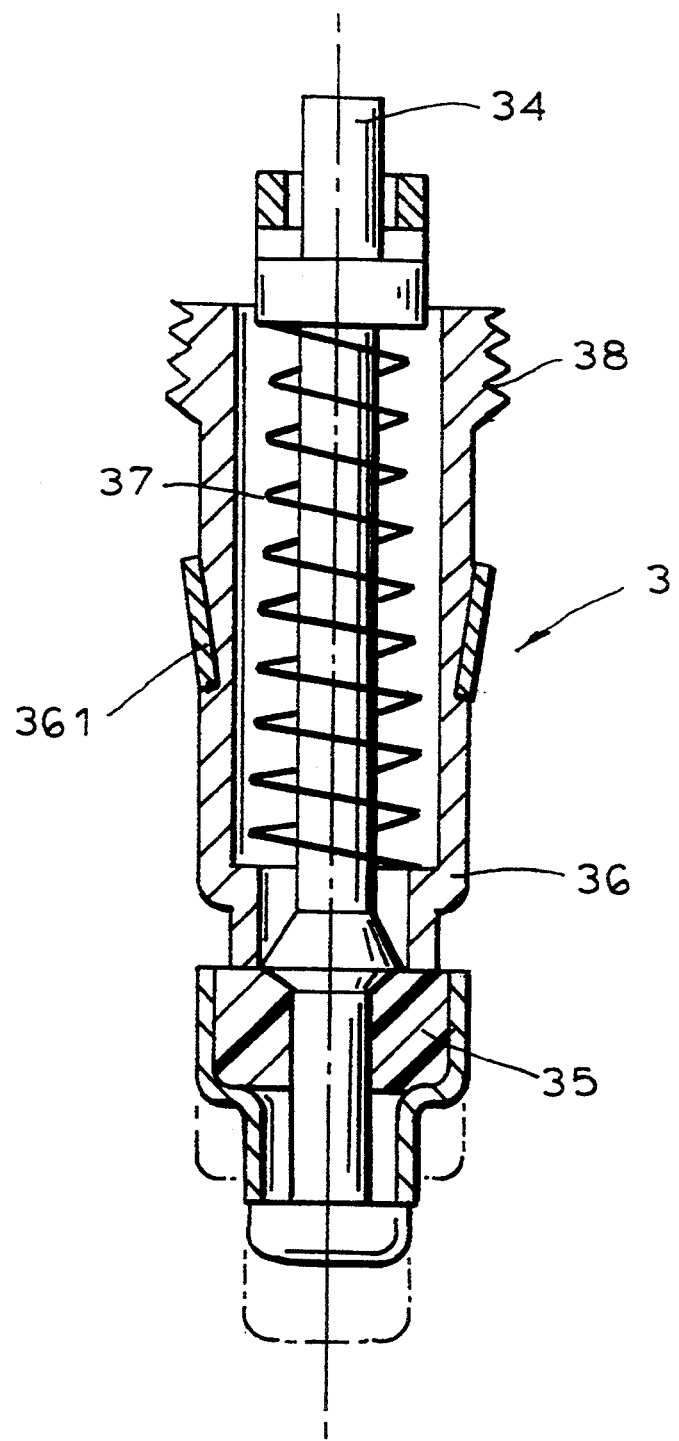
FIG. 4 is a large-scale axial section through the pilot valve.

The valve 3 as shown in FIG. 4 is of the type used in vehicular tires and has a cylindrical housing 36 secured by a screwthread 38 and flared sealing formation 361 in the bore 31. A stem or rod 34 coaxially arranged in the housing 36 has an end carrying a seal ring 35 that can sit on the end of the tubular housing 36 to prevent flow through the valve 3 and a spring 37 urges the stem 34 upward into a closed position of this valve 3. When the stem 34 is pushed down as indicated in dashed lines, such flow is possible.

The piston head 41 is formed with an axially throughgoing bleed passage 43 into which loosely fits an anticlog pin 31. Thus this bleed passage 43 permits limited flow between the chambers 20 and 22.

Figure 2:
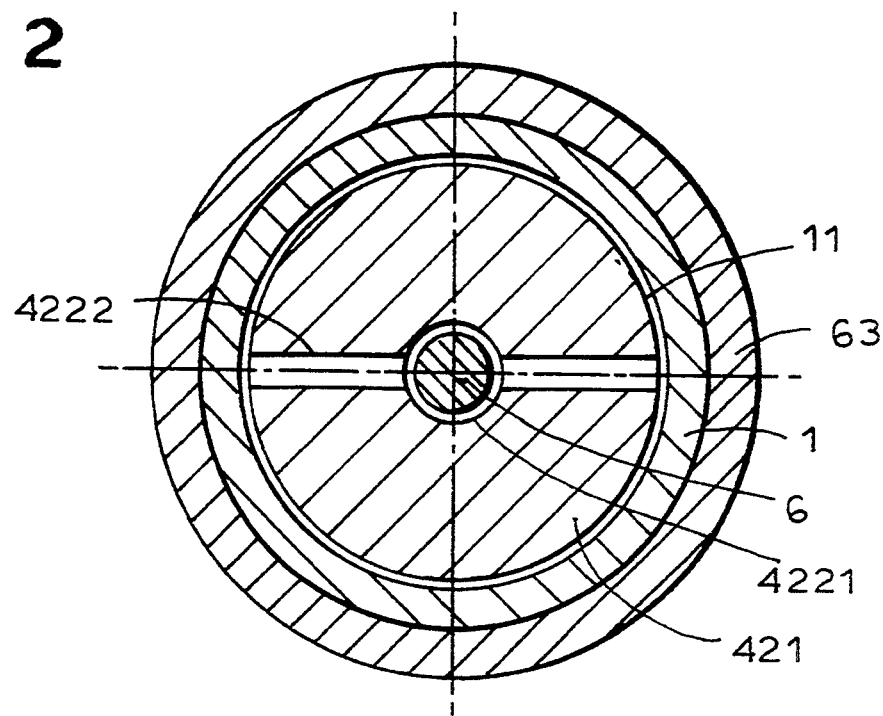
FIGS. 2 and 3 are cross sections taken along lines II—II and III—III of FIG. 1.

An axially centered actuating rod 6 is axially slidable in an axial bore 4211 extending through a floor web 421 of the liner sleeve 42 This rod 6 is received with some play in the bore 4211 to form as shown in FIG. 2 an axially extending annular passage 4221. An O-ring 4223 is provided at the upper end of the bore 4211 to block this end of the passage 4221 and the lower end of the bore 4211 is flared to form a seat in which can engage another O-ring 62 carried on the stem 6. The liner 42 fits with play within the housing 1 to form an outer annular passage 11 which opens at its lower end into the chamber 22 and thence into the outlet chamber 52. As also shown in FIG. 2 radial passages 4222 extend between the upper ends of the inner and outer annular passages 4221 and 11 to interconnect them.

A spring 61 braced between the floor web 421 of the liner sleeve 42 and a disk 60 fixed on the stem 6 urges the stem 6 upward to wedge the O-ring 62 into the lower end of the passage 4221 and block same. A snap ring 630 secures a cup-shaped knob/handle 63 on the upper end of the rod 6 so that same can rotate but not move axially on this rod 6. A split or separable ring 632 secured by screwthreads 6321 into the lower end of the knob 63 can engage upward against a shoulder 14 formed on the housing 1 to make this knob 63 vandal resistant.

Figure 3:
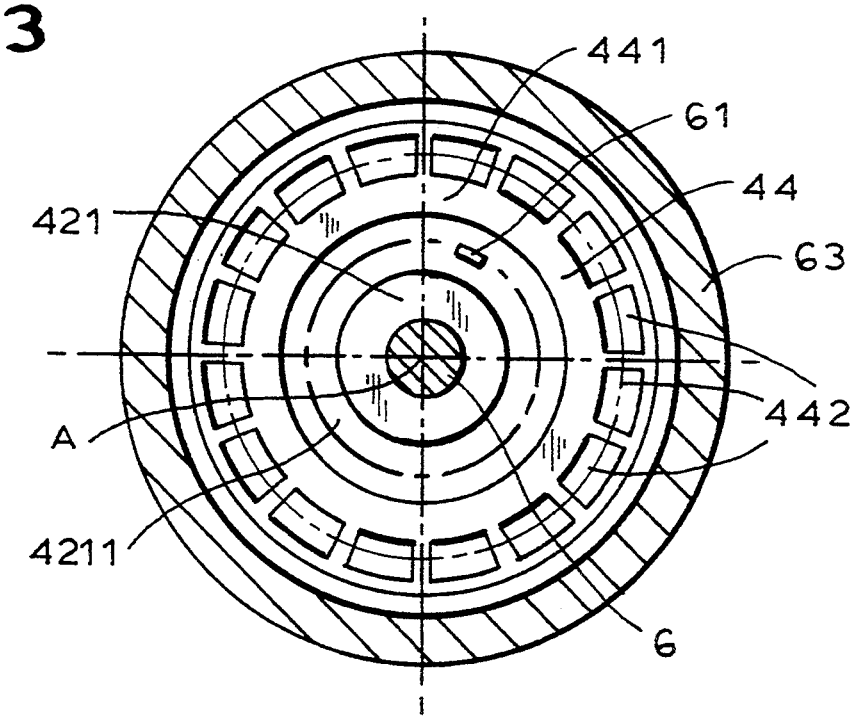

A tubular adjustment screw or sleeve 44 is threaded into the upper end of the liner sleeve 42 and has as seen in FIG. 3 a radially outwardly projecting rim 441 formed with an annular array of upwardly open and in fact axially throughgoing holes 442. The knob 6 is provided offset from the axis A with an axially displaceable coupling screw 631 that is axially aligned with the array of holes 442.

Figure 5:
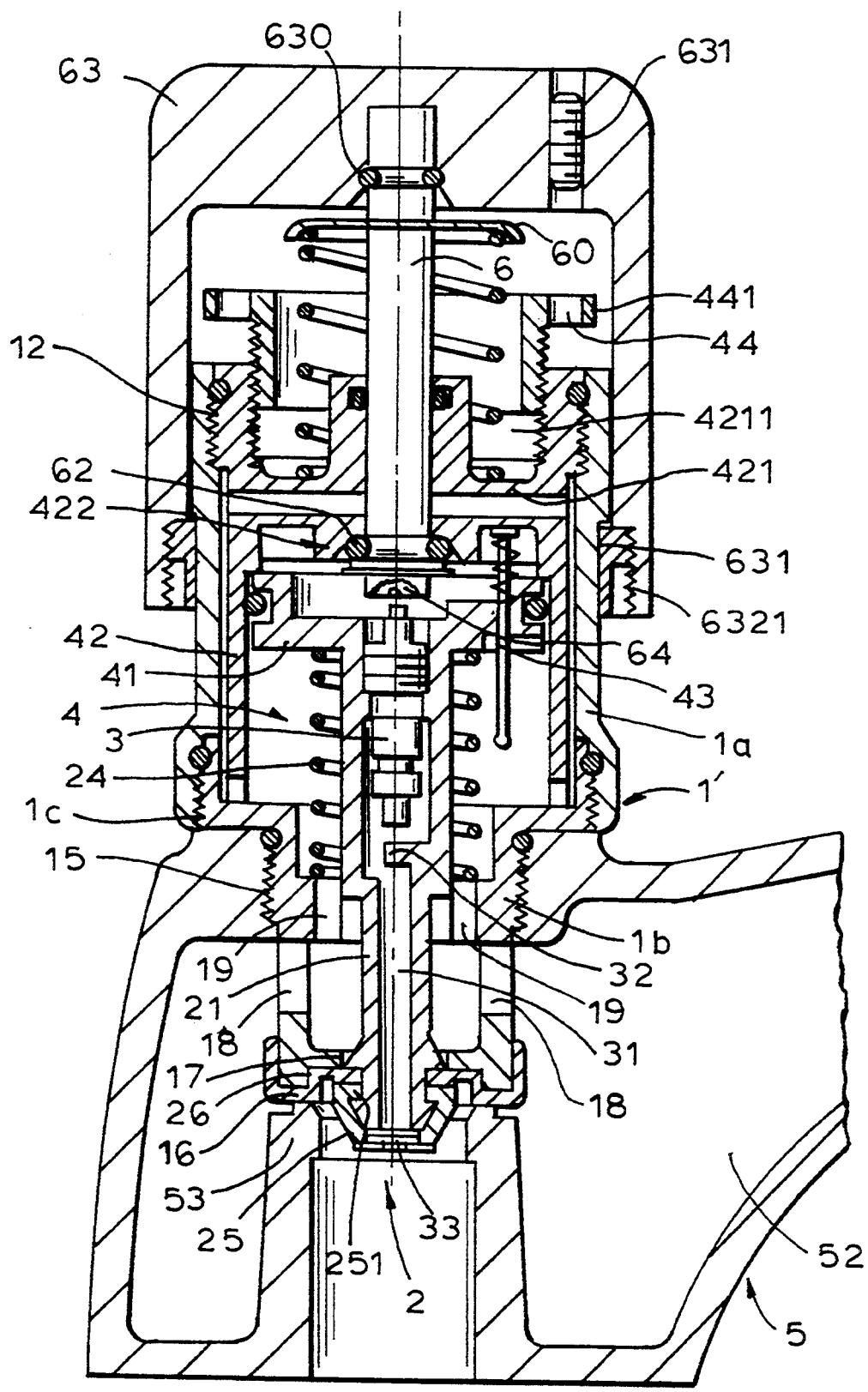
FIG. 5 is a view like FIG. 1 of another valve assembly according to the invention.

The arrangement of FIG. 5, which is identical in function to that of FIG. 1, is different only in that its housing 1' is subdivided into two parts 1a and 1b secured together at a screwthread 1c. Thus the housing part 1a can be unscrewed from the part 1b, leaving the latter in the faucet housing 5 and the piston assembly 4 and its spring 24 in place. This can be done without turning off the water, that is with the chamber 51 pressurized, so that all the parts associated with the knob, including the liner sleeve 42 can be serviced, cleaned, and/or replaced. In addition the lower end of the stem 6 is formed with a seat 64 complementary to the upper end of the rod 34 to minimize wear of these parts. Furthermore the control passage 31 is provided with a deflector web or vane 32 to prevent any liquid from shooting directly up out of it.

The valves described above function as follows:

Normally all of the parts are in the closed position of FIG. 1. Thus the chamber 51 is fully pressurized and the chamber 52 wholly depressurized. The valve 3 is similarly closed so that the control passage 31 upstream (toward the chamber 51) is pressurized but the chambers 20 and 22 are depressurized. The pressure in the chamber 51 and the force of the spring 24 hold the piston 4 in the closed position. The spring 61 holds the valve stem 6 up out of contact with the valve 3.

The valve is actuated normally by a simple depression and immediate release, that is a downward bumping, of the knob 63. To start with this action pushes the stem 6 down against the rod 34, opening the valve 3. Water flows from the chamber 51 along the control passage 31 and through the valve 3 into the control chamber 20, pressurizing same and acting together with the downward force of the stem 6 against the valve 3 to push the piston 4 downward, compressing the spring 24 and pushing the valve washer 26 down off the seat 17. This therefore permits flow from the chamber 51 past the seat 17 and through the holes 18 into the outlet chamber 52.

The seal 62 has meanwhile been pushed down to allow flow along the passages 4221, 4222, and 11 between the chambers 20 and 22, but this flow is minimal because the outer diameter of the passage 4221 is only about 2% larger than the outside diameter of the rod 6 and the diameter of the piston 41 is about five times the diameter of the rod 6. Similarly there will be some flow through the bleed passage 43, but the total of these two flows is small compared to the flow through the valve 3 so that as long as the valve 3 is open these two bypass flows are without great significance.

While the valve will remain open as long as the knob 63 is held down against the stem 34 to hold the valve 3 open, normally as mentioned above the knob 63 is released immediately. The spring 61 snaps the knob 63 and stem 6 up to wedge the seal ring 62 in the lower end of the passage 4221 and of course as soon as the rod 6 loses contact with the valve stem 34 the valve 3 closes. This leaves the control chamber 20 pressurized and the only route for this pressure to bleed off is through the bleed passage 43 which is quite small. Thus as the spring 24 pushes the piston 4 upward the pressure in the control chamber 20 will slowly bleed out through the bleed passage 43 until the seal ring or valve body 26 comes to rest against the seat 17, thereby cutting off flow from the chamber 51 into the chamber 52. As discussed in above-cited U.S. Pat. No. 4,899,778 the inner surface of the liner 42 can be stepped out at its upper end to ease upward travel of the piston 4 to allow the valve to close rapidly in its last stages. The system is restored to its starting position.

The amount of time it takes the valve to close is directly proportional to the amount of liquid in the control chamber 20 which in turn is directly proportional to how far the piston 4 has traveled down in the liner sleeve 42. This travel in turn is defined by the axial distance the knob 63 can travel before it abuts the adjustment element 44. Thus how far this element 44 is screwed into the liner sleeve 42 determines how long the valve remains open.

According to the invention the adjustment element can be coupled rotationally to the knob 63 by the simple expedient of screwing the screw 631 down so that it projects far enough to engage in one of the holes 442 when the knob 63 is depressed. Thus to make an adjustment the screw 631 is turned down and the handle 63 is depressed and rotated in the appropriate direction to screw the element 44 in, thereby increasing the open time, or out, thereby decreasing the open time. Once the adjustment is complete in that the on time is what is wanted, the screw 631 is backed out and left in the knob 63. Thus this adjustment can only be carried out with the aid of a tool, but with the tool is very simple.

In accordance with a further feature of the invention if the knob 63 is pushed down a little during the closing cycle, that is as the pressure is bleeding out of the control chamber 20 through the tiny bleed passage 43, this will open up the passage 4221 and quickly depressurize this control chamber 20 through the passages 4221, 4222 and 11, thereby immediately closing the valve.

Thus according to the invention if the knob 63 is depressed fully once and released the valve will stay open a certain amount of time and will then close automatically. If during this open time the knob 63 is depressed a little, the valve will close immediately. The user therefore has a greater degree of control over the autoclosing valve than has been possible with the prior-art such valves.

We claim:

1. An autoclosing flow-control valve assembly comprising:
   a housing forming an inlet chamber normally filled with a fluid under pressure, an outlet chamber, and a main valve seat between the chambers;
   a piston defining in the housing a control chamber;
   a valve element carried on the piston and engageable with the seat, the piston and valve element being displaceable in the housing between a closed position with the element engaging the seat and blocking flow between the chambers and an open position with the element clear of the seat and permitting flow from the inlet chamber to the outlet chamber;

a piston spring braced between the piston and the housing and urging the piston and element backward into the closed position, the control chamber being of substantially smaller volume in the closed position than in the open position, the piston being formed with a small bleed passage extending between the control chamber and the outlet chamber;

means including a control passage extending between the inlet chamber and the control chamber and a pilot valve in the control passage for, in an open position of the pilot valve, pressurizing the control chamber and pushing the piston and element into the open position and, in a closed position of the pilot valve, for blocking flow through the control passage;

an actuating member axially movable on the housing and actuatable to open the pilot valve;

an actuating spring braced between the member and the housing and urging the member out of contact with the pilot valve;

a bypass passage extending between the control chamber and the outlet chamber and of substantially greater flow cross section than the bleed passage; and a bypass valve in the bypass passage normally blocking flow therethrough and openable by actuation of the actuating member to permit flow through the bypass passage, whereby when the actuating member is actuated with the control chamber full the control chamber can be quickly drained and the valve element and piston moved by the spring into the closed position.

2. The autoclosing valve assembly defined in claim 1 wherein the actuating member is provided with an actuating rod and the housing is formed with a bore loosely receiving the rod, forming around the rod a space constituting a portion of the bypass passage, and forming a bypass-valve seat around the actuating rod, the actuating rod being provided with a seal ring snugly fittable in the bypass-valve seat and forming therewith the bypass valve.

3. The autoclosing valve assembly defined in claim 2 wherein the bypass passage has a portion opening radially inwardly into the space between the rod and the housing.

4. The autoclosing valve assembly defined in claim 3 wherein the rod and bore are cylindrical and the bore has an inside diameter that is about 2% larger than an outside diameter of the rod, the piston having an outside diameter equal to about five times the rod diameter.

5. The autoclosing valve assembly defined in claim 2 wherein the housing includes a liner forming the bore, guiding the piston, and provided with a screwthread connecting itself to the housing.

6. The autoclosing valve assembly defined in claim 5 wherein the housing includes
a faucet housing forming the inlet and outlet chambers and main valve seat, and
a rotation-symmetrical and stepped valve housing having a large-diameter portion holding the liner and a small-diameter portion threaded to the faucet and sealingly engaging the seat.

7. The autoclosing valve assembly defined in claim 2 wherein the rod is formed with a seat complementarily engageable with the pilot valve.

8. The autoclosing valve assembly defined in claim 1 wherein the actuating member is a knob is displaceable along an axis on the housing and rotatable about the axis, the valve assembly further comprising:
an abutment screw rotatable about the axis, threaded into the housing, and axially abuttable with the knob when the knob is actuated;
means for releasably coupling the abutment screw to the knob for rotation of the abutment screw by the knob and changing of an axial position of the abutment screw, whereby the knob can be coupled to the abutment screw to change its position and the amount of time the valve assembly normally takes to autoclose.

9. The autoclosing valve assembly defined in claim 8 wherein the abutment screw is tubular, coaxially surrounds the rod, and has a flange formed coaxially with the rod with an array of holes, the coupling means being a screw extending parallel to but offset from an axis of the rod and screwable through the knob to engage axially in the holes and thereby couple the knob to the abutment screw.

10. The autoclosing valve assembly defined in claim 8 wherein the knob is cup shaped and has a skirt coaxially surrounding the housing, the skirt being provided with radially inwardly projecting retaining ring and the housing having an axially directed shoulder axially engageable with the retaining ring.

11. The autoclosing valve assembly defined in claim 1 wherein the piston is formed with a stem having an end provided with a washer constituting the valve element, the stem being provided with a cap retaining the washer on the stem and having a sieve over a mouth of the control passage.

12. The autoclosing valve assembly defined in claim 1 wherein the housing includes
an outer part carrying the actuating member and the actuating spring and
an inner part threaded to the outer part and carrying the piston, valve element, main spring, and pilot valve.

13. The autoclosing valve assembly defined in claim 1 wherein the control passage is provided with a deflector vane.

* * * * *